(12) United States Patent
Morton et al.

(10) Patent No.: US 7,951,740 B2
(45) Date of Patent: May 31, 2011

(54) METHOD OF INHIBITING IN SITU SILICATE FORMATION IN DESULFURIZATION SORBENTS

(75) Inventors: Robert W. Morton, Bartlesville, OK (US); Roland Schmidt, Bartlesville, OK (US); Glenn W. Dodwell, Bartlesville, OK (US); Gregory C. Allred, Bartlesville, OK (US)

(73) Assignee: China Petroleum & Chemical Corporation, Beijing (CN)

( * ) Notice: Subject to any disclaimer, the term of this patent is extended or adjusted under 35 U.S.C. 154(b) by 211 days.

(21) Appl. No.: 12/208,663

(22) Filed: Sep. 11, 2008

(65) Prior Publication Data
US 2010/0062925 A1   Mar. 11, 2010

(51) Int. Cl.
*B01J 38/30* (2006.01)
*B01J 38/12* (2006.01)
*B01J 38/04* (2006.01)

(52) U.S. Cl. ............................... 502/41; 502/38; 502/34
(58) Field of Classification Search .................. None
See application file for complete search history.

(56) References Cited

U.S. PATENT DOCUMENTS

| | | | |
|---|---|---|---|
| 2,562,571 A | 7/1951 | Partridge | |
| 4,371,730 A | 2/1983 | Eastman | |
| 5,244,641 A | 9/1993 | Khare | |
| 5,306,685 A | 4/1994 | Khare | |
| 5,726,117 A | 3/1998 | Khare | |
| 5,776,331 A | 7/1998 | Khare | |
| 5,972,835 A | 10/1999 | Gupta | |
| 6,274,533 B1 | 8/2001 | Khare | |
| 6,531,053 B2 | 3/2003 | Khare | |
| 6,656,877 B2 | 12/2003 | Sughrue et al. | |
| 6,683,024 B1 | 1/2004 | Khare et al. | |
| 6,803,343 B2 | 10/2004 | Khare | |
| 6,864,215 B2 | 3/2005 | Dodwell et al. | |
| 6,890,877 B2 | 5/2005 | Meier et al. | |
| 6,930,074 B2 | 8/2005 | Khare et al. | |
| 6,951,935 B2 | 10/2005 | Zhang et al. | |
| 7,172,685 B2 | 2/2007 | Thompson et al. | |
| 7,182,918 B2 | 2/2007 | Hoover et al. | |
| 7,241,929 B2 | 7/2007 | Sughrue et al. | |
| 7,323,516 B2 | 1/2008 | Osman et al. | |
| 2001/0027163 A1 | 10/2001 | Khare | |
| 2002/0052291 A1 | 5/2002 | Siriwardane | |
| 2003/0047489 A1 | 3/2003 | Khare | |
| 2003/0070966 A1 | 4/2003 | Khare | |
| 2003/0111389 A1 | 6/2003 | Johnson et al. | |
| 2003/0118495 A1 | 6/2003 | Khare et al. | |
| 2003/0194356 A1 | 10/2003 | Meier et al. | |
| 2003/0232723 A1 | 12/2003 | Dodwell et al. | |
| 2004/0004023 A1 | 1/2004 | Sughrue et al. | |
| 2004/0004029 A1 | 1/2004 | Khare et al. | |
| 2004/0007501 A1 | 1/2004 | Sughrue | |
| 2004/0009108 A1 | 1/2004 | Meier et al. | |
| 2004/0031729 A1 | 2/2004 | Meier et al. | |
| 2004/0084352 A1 | 5/2004 | Meier et al. | |
| 2004/0120875 A1 | 6/2004 | Morton et al. | |
| 2004/0129607 A1 | 7/2004 | Slater | |
| 2004/0140244 A1 | 7/2004 | Sughrue et al. | |

(Continued)

*Primary Examiner* — Emily M Le
*Assistant Examiner* — Sarah Van Oudenaren
(74) *Attorney, Agent, or Firm* — Hovey Williams LLP

(57) ABSTRACT

A method for regenerating desulfurization sorbents that minimizes the in situ formation of one or more silicates. It has been discovered that regenerating sulfur-laden sorbent particles in a carbon oxide-rich environment unexpectedly reduces the in situ silicate formation rate, as compared to similar sorbents regenerated using conventional methods.

26 Claims, 2 Drawing Sheets

U.S. PATENT DOCUMENTS

| | | |
|---|---|---|
| 2004/0178117 A1* | 9/2004 | Morton et al. .................. 208/15 |
| 2004/0222133 A1 | 11/2004 | Khare |
| 2004/0226862 A1 | 11/2004 | Meier et al. |
| 2004/0251168 A1 | 12/2004 | Meier et al. |
| 2005/0098478 A1 | 5/2005 | Gupta et al. |
| 2005/0153838 A1 | 7/2005 | Gislason et al. |
| 2005/0266989 A1 | 12/2005 | Dodwell et al. |
| 2006/0081499 A1 | 4/2006 | Khare |
| 2006/0151358 A1 | 7/2006 | Brown et al. |
| 2006/0243642 A1 | 11/2006 | Thompson et al. |
| 2006/0272984 A1 | 12/2006 | Meier et al. |
| 2007/0015658 A1 | 1/2007 | Turaga et al. |
| 2007/0175795 A1 | 8/2007 | Yao et al. |
| 2007/0225156 A1 | 9/2007 | Sughure et al. |
| 2009/0311156 A1* | 12/2009 | Schmidt et al. ............... 423/230 |

* cited by examiner

METHOD OF INHIBITING IN SITU SILICATE FORMATION IN DESULFURIZATION SORBENTS

BACKGROUND

1. Field of the Invention

This invention relates to methods of regenerating a desulfurization sorbent. In another aspect, the invention concerns methods of inhibiting the in situ formation of one or more silicates during the regeneration of a sulfur-laden sorbent composition.

2. Description of the Related Art

The increased global demand for cleaner burning fuels has driven the worldwide effort to reduce the sulfur levels in many hydrocarbon-based fuels, such as gasoline and diesel. Lower-sulfur fuel blends contribute to improved air quality by minimizing the adverse impact on emissions-regulating automotive components, such as, for example, highly sulfur-sensitive catalytic converters. Automobiles operating with inefficient or poisoned catalytic converters emit exhaust containing high levels of non-combusted, heavier-than-methane hydrocarbons, nitrogen oxides (i.e., $NO_x$), sulfur oxides (i.e., $SO_x$), and carbon monoxide. Catalyzed by sunlight, these components react to form ground-level ozone, more commonly referred to as "smog."

In recent years, the public discussion regarding the reduction of sulfur levels in fuel blends has not focused on whether or not such a reduction should occur, but, rather, has centered on the required level of reduction, as well as the time frame for the implementation of corresponding regulations. Within the last several years, several countries, including China, the United States, Japan, India, Brazil, and the European Union have begun issuing mandates requiring progressively lower sulfur levels (e.g., some less than 10 ppmw) in automotive fuels, including both gasoline and diesel.

These stricter regulations have led oil refiners and other fuel producers/blenders to alter their current fuel production schemes to include processes for desulfurizing the hydrocarbon-containing streams used as blendstocks for producing different types of consumer fuels, including, for example, typical automotive gasolines and diesels, heavy equipment diesel fuels, racing gasolines, aviation gasolines, boat gasolines, and the like. Examples of hydrocarbon streams used as blendstocks to produce these fuels include, but are not limited to, thermally and/or catalytically processed gasolines such as, for example, thermally cracked gasoline, visbreaker gasoline, coker gasoline and catalytically cracked gasoline, which are sometimes collectively referred to as "cracked gasolines."

Many desulfurization processes and systems employ a catalyst or sorbent to chemically and/or physically remove sulfur-containing compounds from the hydrocarbon stream being desulfurized. Oftentimes, during operation of the desulfurization system, conditions may arise that contribute to the formation of one or more compounds in, on, or within the catalyst or sorbent that adversely affect its desulfurization activity. For example, when the sorbent or catalyst includes a silica-containing compound in association with a metal oxide compound, oxidative regeneration of the sorbent or catalyst can cause the formation of one or more silicates in, on, and/or within the sorbent or catalyst. Silicates are generally inert, but can occupy the active sites on the catalyst or sorbent, thereby reducing the desulfurization activity of the catalyst or sorbent. Because silicates cannot be removed by conventional oxidative regeneration methods, catalyst or sorbent that has been deactivated by the formation of silicates must generally be deinventoried from the desulfurization unit and completely replaced. To avoid the high operating and lost production costs associated with such a catalyst or sorbent replacement, refiners have long desired a method of minimizing the formation of silicates on desulfurization catalyst and/or sorbent.

SUMMARY

In one embodiment of the present invention, there is provided a process for regenerating a plurality of sorbent particles. In one embodiment, the process comprises the following steps: (a) introducing a plurality of sulfur-laden sorbent particles into a regeneration zone, wherein the sulfur-laden sorbent particles comprise a support component that comprises a silica source; (b) introducing one or more gas streams into the regeneration zone, wherein the one or more gas streams comprise oxygen and carbon oxide; and (c) regenerating at least a portion of the sulfur-laden sorbent particles in the regeneration zone under regeneration conditions to thereby provide a plurality of regenerated sorbent particles, wherein the total molar ratio of carbon oxide to oxygen in the one or more gas streams is greater than about 0.01:1.

In another embodiment of the present invention, there is provided a desulfurization process. In one embodiment, the process comprises the following steps: (a) contacting a plurality of sorbent particles with a sulfur-containing hydrocarbon stream in a fluidized bed desulfurization reactor under desulfurization conditions to thereby provide a sulfur-depleted hydrocarbon stream and a plurality of sulfur-laden sorbent particles; (b) contacting at least a portion of the sulfur-laden sorbent particles with a regeneration gas in a regeneration zone under regeneration conditions to thereby provide a plurality of regenerated sorbent particles; and (c) contacting at least a portion of the regenerated sorbent particles with a reduction agent in a reduction zone under reducing conditions to thereby provide a plurality of reduced sorbent particles, wherein the regeneration conditions include a carbon dioxide partial pressure greater than 1.25 psig.

BRIEF DESCRIPTION OF THE FIGURES

Certain embodiments of the present invention are described in detail below with reference to the enclosed figures, in which like reference numerals are used to indicate like parts in the various views, wherein.

DETAILED DESCRIPTION

The inventors have recently discovered that, in general, increased rates of silicate formation can be observed when catalysts or sorbents that include silica or a silica-containing component in association with a metal oxide component are exposed to high temperatures in the presence of water and/or oxygen. Although not wishing to be bound by theory, it is believed that the silicates are the result of a reaction between the metal oxide component and free silica in the catalyst or sorbent. Further, the presence of one or more sulfur-based acids (e.g., sulfuric and/or sulfurous acid) is believed to help promote the conversion of metal oxide to silicate in the presence of free silica. Since these conditions are typically present during the regeneration of a sulfur-laden sorbent or catalyst, in situ silicate formation is common in the regeneration zones of many types of desulfurization systems.

The inventors have found that when the metal oxide component of the sorbent or catalyst provides at least a portion of the active sulfur removal sites, the formation of a silicate in, on, or within the sorbent composition can substantially hinder its desulfurization activity. Although not wishing to be bound by theory, it is believed that by reacting with the free silica in the presence of water and/or oxygen, the formation of in situ silicate deprives the sorbent of its active desulfurization sites by reducing the amount of metal oxide available to chemically and/or physically adsorb and/or absorb sulfur compounds from the sulfur-containing hydrocarbon feet stream.

In one embodiment, the present invention is at least partially based on the discovery that regenerating a sorbent composition in a carbon oxide-enriched environment unexpectedly reduces the silicate generation rate and total silicate concentration of desulfurization sorbent. As used herein, the term "carbon oxide" collectively refers to carbon dioxide, carbon monoxide, and combinations thereof. Although not wishing to be bound by theory, it is hypothesized that the reduction in silicate formation achieved during regeneration in a carbon oxide-enriched environment can be at least partially attributed to the reduction in sulfuric and/or sulfurous acid, a byproduct created when sulfur dioxide and/or sulfur trioxide resulting from the regeneration of the sulfur-laden sorbent, react with water present in the regenerator. It is believed that the reduction of silicate formation may be at least partially due to the preferential reaction of water with carbon oxide to thereby inhibit the formation of sulfur-based acids, which, as discussed previously, have been thought to promote the conversion of metal oxide to silicate. A desulfurization system configured according to one embodiment of the present invention will now be described in more detail with respect to FIG. 1.

Figure 1:
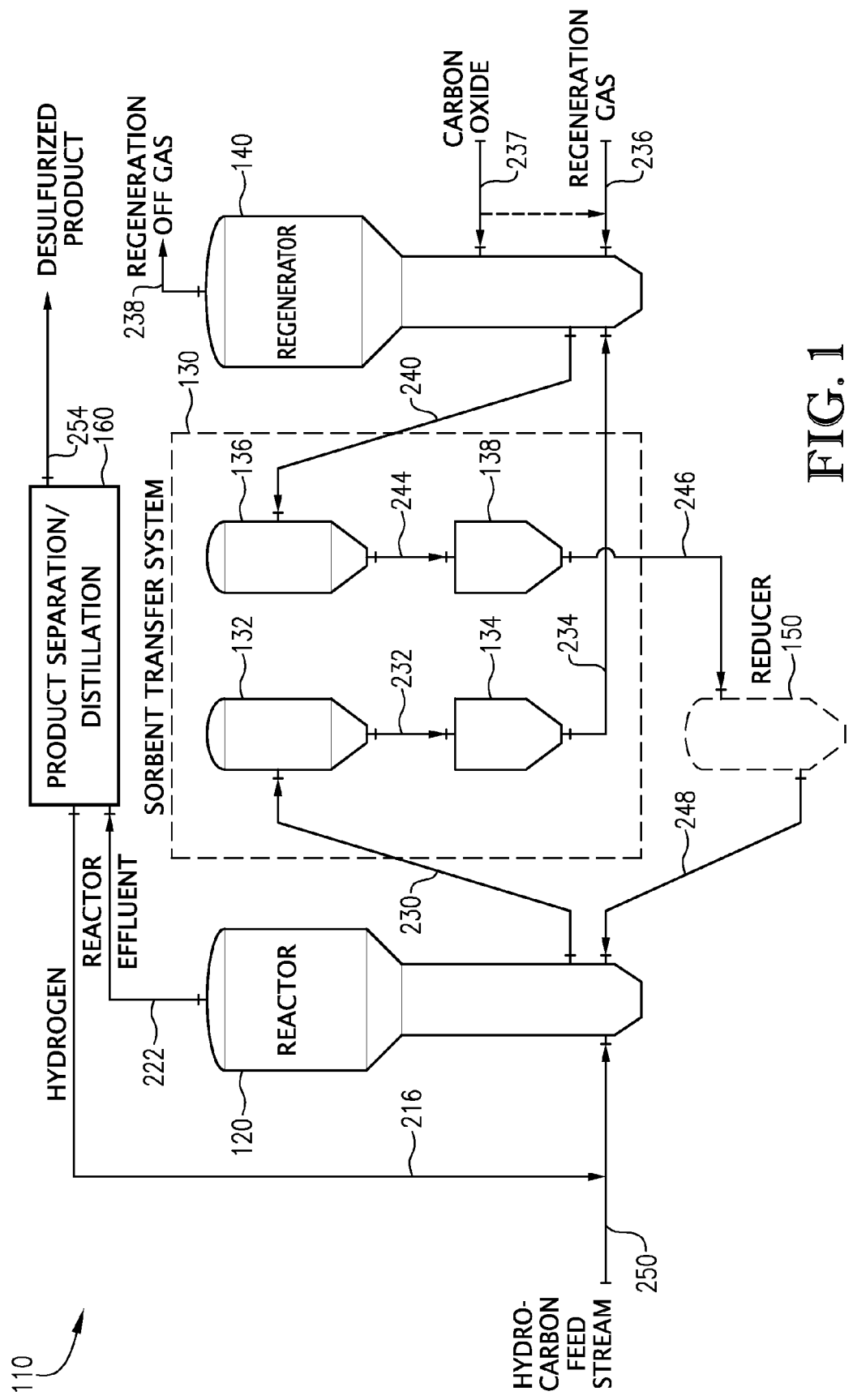
FIG. 1 is a schematic diagram of a desulfurization system configured according to one embodiment of the present invention that employs a plurality of desulfurization sorbent particles.

Referring now to FIG. 1, a desulfurization system 110, configured according to one embodiment of the present invention, is illustrated. In general, desulfurization system 110 can be any system capable of at least partially desulfurizing a sulfur-containing hydrocarbon feed stream using a plurality of fluidizable, circulatable solid sorbent particles as described above. The main components of desulfurization system 110 illustrated in FIG. 1 include a reaction vessel (i.e., a reactor) 120, a sorbent transfer system 130, a regeneration vessel (i.e., a regenerator) 140, an optional reduction vessel (i.e., reducer 150), and a product separation/distillation zone 160.

Reactor 120, regenerator 140, and/or reducer 150 can comprise any vessel from which solid sorbent particles can be added or withdrawn in a batch, semi-batch, semi-continuous, or continuous manner. In general, reactor 120, regenerator 140, and/or reducer 150 can comprise a fluidized particle bed (i.e., a fluidized bed vessel), a fixed particle bed (i.e., a fixed bed vessel), or any combination thereof (i.e., a hybrid vessel). In one embodiment, reactor 120, regenerator 140, and reducer 150 each comprise fluidized particle beds.

Sorbent transfer system 130 can comprise any suitable mechanism to transfer at least a portion of the solid sorbent particles employed in desulfurization system 110 between reactor 120, regenerator 140, and/or reducer 150. In one embodiment illustrated in FIG. 1, sorbent transfer system 130 can comprise a reactor receiving vessel (i.e., receiver) 132, a reactor-side transfer/stripping vessel (i.e., reactor stripper) 134, a regenerator receiving vessel (i.e., receiver) 136, and a regenerator-side transfer/stripping vessel (i.e., regenerator stripper) 138.

Product separation/distillation zone 160 can employ any process scheme and/or comprise any equipment required to further process the desulfurized product stream exiting reactor 120 in order to achieve one or more desired product specifications. In one embodiment, product separation/distillation zone 160 can comprise at least one separation vessel or column (not shown) operable to remove relatively more volatile materials (i.e., hydrogen, nitrogen, methane, ethane, and the like) from the relatively less volatile desulfurized hydrocarbon material. In addition, product separation/distillation zone 160 can comprise any number and configuration of heat exchangers and other similar equipment as known in the art in order to produce a desulfurized product stream having the desired temperature and/or vapor fraction.

In operation, as depicted in FIG. 1, a sulfur-containing hydrocarbon stream in conduit 250 can be introduced into a desulfurization zone, which can be at least partially defined within desulfurization reactor 120. In the desulfurization zone, the hydrocarbon stream can be at least partially desulfurized under desulfurization conditions via contact with a plurality of solid sorbent particles. In one embodiment of the present invention, the sulfur-containing feed stream in conduit 250 can comprise gasoline, diesel, or combinations thereof. Gasoline typically comprises a mixture of hydrocarbons having a boiling point in the range of from about 35° C. (95° F.) to about 260° C. (500° F.). In general, gasolines comprise in the range of from about 5 to about 50 weight percent, about 10 to about 35 weight percent, or 15 to 25 weight percent of olefins and/or in about 10 to about 55, about 15 to about 45 weight percent, or 20 to 40 weight percent aromatics, based on the total weight of the gasoline stream. Examples of gasolines include, but are not limited to, naphthas such as straight-naphtha, coker naphtha, catalytic gasoline, visbreaker naphtha, alkylate, isomerate, and reformate and/or catalytically- or thermally-cracked gasolines such as coker gasoline, visbreaker gasoline, fluidized catalytic cracker (FCC) gasoline, heavy oil cracker (HOC) gasoline, hydrocracker gasoline.

Diesel fuel can generally be characterized as having a boiling point in the range of from about 150° C. (302° F.) to about 400° C. (752° F.), and generally comprises in the range of from about 10 to about 90 weight percent, about 20 to about 80 weight percent, or to 60 weight percent aromatics and/or less than about 10 weight percent, less than about 5 weight percent, or substantially no olefins. Examples of diesel fuels can include, but are not limited to, light cycle oil, kerosene, jet fuel, straight-run diesel, hydrotreated diesel, and combinations thereof. In one embodiment, the gasoline and/or diesel fuel in conduit 250 may have previously been fractionated and/or hydrotreated in an upstream unit (not shown) prior to entering reactor 120.

In one embodiment of the present invention, the hydrocarbon feed stream can comprise one or more sulfur-containing compounds, which can include, but are not limited to, hydrogen sulfide ($H_2S$), carbonyl sulfide (COS), carbon disulfide ($CS_2$), mercaptans (RSH), organic sulfides (R—S—R), organic disulfides (R—S—S—R), thiophene, substituted thiophenes, organic trisulfides, organic tetrasulfides, benzothiophene, alkyl thiophenes, alkyl benzothiophenes, alkyl dibenzothiophenes, and combinations thereof. In general, R can be an alkyl, cycloalkyl, or aryl group comprising in the range of from about 1 to about 15 carbon atoms. In another embodiment, at least about 50 weight percent, at least about 75 weight percent, or at least about 90 weight percent of the total mass of atomic sulfur in the sulfur-containing feed stream in conduit 250 can comprise organosulfur compounds. In one embodiment, the feed stream in conduit 250 can have a sulfur content greater than about 50 parts per million by weight (ppmw), or in the range of from about 100 to about 10,000 ppmw, about 150 to about 5,000 ppmw, based on the total weight of the stream. Sulfur content refers to the amount of atomic sulfur in the sulfur-containing compounds and can be determined according to various ASTM standard methods, including, for example, ASTM D 2622-08 *Standard Test Method for Sulfur in Petroleum Products by Wavelength Dispersive X-ray Fluorescence Spectrometry.*

The solid sorbent particles contacted with the sulfur-containing hydrocarbon stream in reactor 120 can be any sufficiently fluidizable, circulatable, and regenerable sorbent composition having sufficient desulfurization activity and sufficient attrition resistance at the desulfurization conditions within reactor 120. In one embodiment, the sorbent particles employed in fluidized bed reactor 120 comprise a support component and a promoter metal component. A description of such a sorbent composition and a method of its preparation are provided in U.S. Pat. Nos. 6,429,170 and 7,241,929, the entire disclosures of which are incorporated herein by reference to the extent not inconsistent with the present disclosure.

In one embodiment of the present invention, the support component can comprise a zinc component, a silica source, and an alumina component. In addition, the sorbent composition can optionally employ one or more binders, fillers, and/or pore enhancers as known in the art. According to one embodiment, the support component of the sorbent composition employed in desulfurization system 110 can comprise zinc oxide, perlite, and alumina.

According to one embodiment, the promoter metal component can comprise a promoter metal selected from the group consisting of nickel, cobalt, iron, manganese, tungsten, silver, gold, copper, platinum, zinc, tin, ruthenium, molybdenum, antimony, vanadium, iridium, chromium, palladium, rhodium, and mixtures thereof. In one embodiment, at least a portion of the promoter metal component can comprise a reduced-valence promoter metal. As used herein, the term "reduced-valence" refers to a promoter metal having a valence that is less than the valence of the metal in its common oxidized state. For example, in one embodiment wherein the promoter metal comprises nickel, the reduced-valence promoter metal can have a valence less than 2 or a valence of zero. According to one embodiment, at least about 65 percent, at least about 75 percent, at least about 90 percent, or substantially all of the promoter component of the sorbent entering reactor 120 via conduit 250 and/or in the desulfurization zone of reactor 120 can comprise a reduced-valence promoter metal.

In one embodiment of the present invention, the promoter metal component comprises, consists of, or consists essentially of, a substitutional solid metal solution. Substitutional solid solutions are a subset of alloys that are formed by the direct substitution of the solute metal for the solvent metal atoms in the crystal structure. For example, it is believed that the substitutional solid metal solution $M_A Zn_B$ is formed by the solute zinc metal atoms substituting for the solvent promoter metal atoms. Three basic criteria exist that favor the formation of substitutional solid metal solutions: (1) the atomic radii of the two elements are within 15 percent of each other; (2) the crystal structures of the two pure phases are the same; and (3) the electronegativities of the two components are similar. The promoter metal (as the elemental metal or metal oxide) and zinc (as the elemental metal or metal oxide) employed in the sorbent described herein typically meet at least two of the three criteria set forth above. For example, when the promoter metal is nickel, the first and third criteria, are met, but the second is not. The nickel and zinc metal atomic radii are within 10 percent of each other and the electronegativities are similar. However, nickel oxide (NiO) preferentially forms a cubic crystal structure, while zinc oxide (ZnO) prefers a hexagonal crystal structure. A nickel zinc solid solution retains the cubic structure of the nickel oxide. Forcing the zinc oxide to reside in the cubic structure increases the energy of the phase, which limits the amount of zinc that can be dissolved in the nickel oxide structure. This stoichiometry control manifests itself microscopically in a 92:8 nickel zinc solid solution ($Ni_{0.92} Zn_{0.08}$) that is formed during reduction and microscopically in the repeated regenerability of sorbent.

In one embodiment, the promoter metal component can comprise a substitutional solid metal solution characterized by the formula: $M_A Zn_B$, wherein M is the promoter metal and A and B are each numerical values in the range of from about 0.01 to about 0.99. In the above formula for the substitutional solid metal solution, A can be in the range of from about 0.70 to about 0.98 or 0.85 to 0.95 and B can be in the range of from about 0.03 to about 0.30 or 0.05 to 0.15. In one embodiment, A+B=1. In another embodiment, the sorbent composition can further comprise a promoter metal-zinc aluminate substitutional solid solution characterized by the formula: $M_Z Zn_{(1-Z)} Al_2 O_4$, where M is the promoter metal and Z is a numerical value in the range of from 0.01 to 0.99. In addition, according to one embodiment, the silica source can comprise a porosity enhancer, which, when employed, can be any compound which ultimately increases the macroporosity of the solid sorbent particles.

Table 1, below, summarizes broad, intermediate, and narrow ranges for the amount of zinc oxide, reduced-valence promoter metal component ($M_A Zn_B$), perlite, and promoter metal-zinc aluminate ($M_Z Zn_{(1-Z)} Al_2 O_4$) in a sorbent composition employed in reactor 120 according to one embodiment of the present invention.

TABLE 1

Sorbent Composition Components

| | Reduced Sorbent Composition (wt %) | | | |
|---|---|---|---|---|
| Range | ZnO | $M_A Zn_B$ | Perlite | $M_Z Zn_{(1-Z)} Al_2 O_4$ |
| Broad | 10-90 | 5-80 | 2-50 | 2-50 |
| Intermediate | 20-60 | 10-60 | 5-30 | 5-30 |
| Narrow | 30-40 | 30-40 | 10-20 | 10-20 |

Typically, the sorbent particles can have a mean particle size in the range of from about 1 to about 500 micrometers (microns) or about 10 to about 300 microns, as determined by using a using a RO-TAP Testing Sieve-Shaker, manufactured by W. S. Tyler, Inc. of Mentor, Ohio, or other comparable sieves. To determine mean particle size, the material to be measured is placed in the top of a nest of standard 8-inch diameter stainless steel framed sieves with a pan on the bottom. The material undergoes sifting for a period of about 10 minutes; thereafter, the material retained on each sieve is weighed. The percent retained on each sieve is calculated by dividing the weight of the material retained on a particular sieve by the weight of the original sample. This information is used to compute the mean particle size, by the method outlined in Chapter 3 of *Fluidization Engineering* by Kunii and Levenspiel (1987). Typically, the average density of the solid sorbent particles can be in the range of from about 0.5 to about 1.5 grams per cubic centimeter (g/cc), about 0.8 to about 1.3 g/cc, or 0.9 to 1.2 g/cc. In one embodiment, the particle size and density of the sorbent particles qualify the particles as Group A solids under the Geldart group classification system described in *Powder Technology*, vol. 7, pages 285-292 (1973). In another embodiment, the solid sorbent particles can be in the form of microspheres.

Referring back to FIG. 1, the sulfur-containing hydrocarbon stream in conduit 250 can be introduced into reactor 120, wherein the stream can be contacted with a plurality of sorbent particles under desulfurization conditions to thereby at least partially desulfurize the hydrocarbon stream. In general, the desulfurization conditions employed in reactor 120 can include a total pressure, temperature, and weight hourly space velocity. In one embodiment, the temperature in reactor 120 can be in the range of from about 95° C. (203° F.) to about 815° C. (1499° F.), about 260° C. (500° F.) to about 480° C. (896° F.), or 315° C. (599° F.) to 455° C. (851° F.). The total pressure can be in the range of from about 205 kPa (29.7 psia) to about 10,450 kPa (1,515.6 psia), about 450 kPa (65.2 psia) to about 4,250 kPa (616 psia), or 795 kPa (115 psia) to 1,480 kPa (215 psia). Weight hourly space velocity (WHSV) measures the mass flow rate (kg/h) at standard temperature and pressure (STP) per kilogram of sorbent present in the desulfurization zone of reactor 120. In one embodiment, the WHSV in reactor 120 can be in the range of from about 0.5 $h^{-1}$ to about 50 $h^{-1}$ or about 1 $h^{-1}$ to about 20 $h^{-1}$.

Optionally, other reactants, either alone or with a diluent, can be introduced into reactor 120. For example, in one embodiment, an additional reactant stream comprising at least about 25 volume percent, at least about 50 percent, at least about 75 percent, or at least 90 percent hydrogen can be introduced into the desulfurization zone of reactor 120. In one embodiment (not shown), the hydrogen-containing stream can be introduced directly into reactor 120. In another embodiment, the hydrogen-containing stream in conduit 216 can be combined with the sulfur-containing hydrocarbon feed stream in conduit 250 prior to entering reactor 120, as shown in FIG. 1.

In general, high purity hydrogen may not be required and diluents, such as, for example, methane, carbon dioxide, flue gas, nitrogen, and combinations thereof can additionally be present in the hydrogen-containing stream introduced into the desulfurization zone. According to one embodiment, at least a portion of the hydrogen-containing stream introduced into the desulfurization zone can originate from a source external to desulfurization system 110. In another embodiment, at least a portion of the hydrogen-containing stream can originate from within desulfurization system 110, such as, for example, from product separation/distillation zone 160, as shown in FIG. 1. According to one embodiment, the total amount of hydrogen introduced into reactor 120 can be such that the mole ratio of hydrogen to hydrocarbon in the desulfurization zone can be in the range of from about 0.01:1 to about 50:1, about 0.1:1 to about 10:1, or 0.2:1 to 2:1.

In one embodiment, the desulfurization conditions in reactor 120 can be sufficient to vaporize at least a portion of the sulfur-containing hydrocarbon stream introduced into reactor 120. In one embodiment, at least about 90 percent, at least about 95 percent, at least about 98 percent, or substantially all of the sulfur-containing hydrocarbon stream in conduit 250 can be in the vapor phase in the desulfurization zone of reactor 120.

When the sorbent composition is contacted with the sulfur-containing hydrocarbon fluid in the desulfurization zone, at least a portion of the sulfur compounds in the sulfur-containing stream can be removed from the hydrocarbon stream. While not wishing to be bound by theory, it is believed that at least a portion of the sulfur removed from the sulfur-containing fluid can be employed to convert at least a portion of a metal oxide (e.g., zinc oxide) of the sorbent composition to a metal sulfide (e.g., zinc sulfide). In contrast to most conventional sulfur removal processes (e.g., hydrodesulfurization), substantially none of the sulfur removed from the sulfur-containing feed stream is converted to hydrogen sulfide. Rather, in one embodiment, the desulfurized effluent stream exiting reactor 120 via conduit 222 can comprise less than about 200 weight percent, less than about 150 weight percent, or less than 100 weight percent of the total amount of hydrogen sulfide contained in the sulfur-containing feed stream in conduit 250.

After removing at least a portion of the sulfur from the hydrocarbon feed stream in the desulfurization zone of reactor 120, the resulting sulfur-laden sorbent and sulfur-depleted (e.g., desulfurized) hydrocarbon effluent stream can be separated according to any manner or method known in the art. Examples of solid/fluid separation mechanisms include, but are not limited to, cyclonic devices, settling chambers, impingement devices, filters, and combinations thereof. Once the desulfurized hydrocarbon effluent stream exits reactor 120 via conduit 222, at least a portion of the desulfurized hydrocarbon stream can be further processed in product separation/distillation zone 160, as shown in FIG. 1.

According to one embodiment, the desulfurization zone of reactor 120 can have an overall sulfur removal efficiency greater than about 50 percent, greater than about 80 percent, greater than about 90 percent, or greater than about 95 percent, wherein sulfur removal efficiency is defined according to the following formula: (mass of sulfur entering reactor 120 via stream in conduit 250—mass of sulfur in the sulfur-depleted hydrocarbon stream exiting product separation/distillation zone 160 in conduit 254)/(mass of sulfur entering reactor 120 via stream in conduit 250), expressed as a percentage. In general, the sulfur-depleted hydrocarbon stream exiting desulfurization system 110 via conduit 254 can have an atomic sulfur content less than about 50 ppmw, less than about 20 ppmw, less than about 15 ppmw, less than about 10 ppmw, or less than 5 ppmw, based on the total weight of the stream.

As illustrated in FIG. 1, the separated, sulfur-laden sorbent particles exiting reactor 120 can then be routed via conduit 230 to reactor receiver 132. Thereafter, a portion of the sulfur-laden sorbent particles withdrawn from reactor receiver 132 can be transported via conduit 232 to a reactor stripper 134, which can be operable to remove a portion or substantially all of the residual hydrocarbon material from the sorbent particles. The stripping zone defined within reactor stripper 134 can employ a stripping agent (e.g., nitrogen) and can be operated at a temperature in the range of from about 35° C. (95° F.) to about 535° C. (995° F.) and a pressure in the range of from about 275 kPa (39.9 psia) to about 3,550 kPa (515 psia). Stripping can be carried out for a period of time sufficient to achieve the desired level of stripping, which can generally be in the range of from about 0.1 to about 4 hours or about 0.3 to 1 hour. In an alternative embodiment, at least a portion of the stripping can be carried out in reactor receiver 132 in addition to or in the absence of reactor stripper 134.

As illustrated in FIG. 1, the sulfur-laden sorbent particles can then be transported via conduit 234 to a regeneration zone at least partially defined within regenerator 140, wherein at least a portion of the sorbent can be regenerated under regenerating conditions to thereby provide a plurality of regenerated sorbent particles. In one embodiment, the regeneration conditions can include a temperature in the range of from about 95° C. (203° F.) to about 815° C. (1499° F.), about 260° C. (500° F.) to about 650° C. (1202° F.), or 455° C. (851° F.) to 590° C. (1094° F.) and a pressure in the range of from about 175 kPa (25.4 psia) to about 10,450 kPa (1515.6 psia), or 205 kPa (29.7 psia) to about 795 kPa (115 psia). According to one embodiment of the present invention, the regeneration conditions can include an oxygen partial pressure greater than about 105 kPa (15.2 psia), greater than about 110 kPa (16 psia), or in the range of from about 115 kPa (16.7 psia) to about 160 kPa (23.2 psia) and/or a water partial pressure in the range of from about 105 kPa (15.2 psia) to about 205 kPa (29.7 psia), about 110 kPa (16 psia) to about 170 kPa (24.7 psia), or 115 kPa (16.7 psia) to 160 kPa (23.2 psia). Typically, the regeneration can be carried out for a period of time in the range of from about 0.05 to about 60 hours, about 0.1 to about 24 hours, about 0.2 to about 12 hours, or 0.25 to about 4 hours.

In one embodiment, one or more regeneration streams can be introduced into the regeneration zone in regenerator 140 and can contact at least a portion of the sulfur-laden sorbent particles therein. Typically, the regeneration gas stream(s) comprise oxygen and, in one embodiment, can comprise an air or enriched air stream. Although not wishing to be bound by theory, it has been posited that the oxygen-containing regeneration gas stream introduced into the regeneration zone of regenerator 140 via conduit 236 can fulfill several functions. For example, the regeneration gas can help promote the conversion of at least a portion of the metal sulfide (e.g., zinc sulfide) associated with the sulfurized sorbent back to metal oxide (e.g., zinc oxide), it can promote the return of at least a portion of the promoter metal component to its common oxidized (i.e., unreduced) state, and/or it can combust any residual hydrocarbon or other carbonaceous deposits present in or on the sorbent particles.

As discussed previously, the inventors have found that regenerating at least a portion of the sulfur-laden sorbent particles in a carbon oxide-rich environment unexpectedly inhibits the in situ formation of silicates on, in, or within the regenerated sorbent particles. In one embodiment of the present invention, the regeneration conditions can include a carbon oxide partial pressure in the range of from about 110 kPa (15.95 psia) to about 240 kPa (34.8 psia), about 110 kPa (16.0 psia) to about 205 kPa (29.7 psia), or 113 kPa (16.4 psia) to 170 kPa (24.7 psia). According to one embodiment, the carbon oxide present in the regeneration zone can be introduced from a source external to regenerator 140, while, in another embodiment, at least a portion of the carbon oxide in the regeneration zone can be generated in situ during the combustion of carbonaceous deposits on the sulfur-laden sorbent.

In one embodiment illustrated in FIG. 1, at least a portion of the carbon oxide can optionally be introduced to regenerator 140 via conduit 237. According to one embodiment, at least a portion of the carbon oxide stream in conduit 237 can be combined with the oxygen-containing regeneration gas in conduit 236 prior to entering regenerator 140.

According to one embodiment, the regeneration gas stream in conduit 236 can comprise less than about 0.05 mole percent, less than about 0.025 mole percent, or less than about 0.01 mole percent carbon oxide, while the carbon oxide stream in conduit 237 can comprise at least about 50 mole percent, at least about 75 mole percent, at least about 80 mole percent, at least 95 mole percent, or substantially all carbon oxide. In one embodiment of the present invention, the combined total molar ratio of carbon oxide to oxygen in the regeneration gas and/or carbon oxide stream can be greater than about 0.01:1, greater than about 0.5:1, greater than 1:1, or greater than 1.2:1, wherein the combined molar ratio is defined by the following formula: (total moles of carbon oxide in regeneration gas in conduit 236+total moles of carbon oxide in carbon oxide stream in conduit 237)/(total moles of oxygen in regeneration gas stream in conduit 236+total moles of oxygen in carbon oxide stream in conduit 237). If additional streams are introduced into regenerator 140, the formula can be adjusted accordingly.

In another embodiment of the present invention, at least a portion of the carbon oxide in the regeneration zone of regenerator 140 can be produced in situ from the combustion of carbonaceous deposits on the sulfur-laden sorbent particles. In one embodiment, the sulfur-laden sorbent particles introduced into regenerator 140 can have a carbon-on-sorbent content of at least about 3.5 weight percent, at least about 4.5 weight percent, at least about 5 weight percent, or at least 5.25 weight percent, based on the total weight of the sorbent composition, when the sulfur-laden sorbent particles are introduced into regenerator 140. When contacted with the oxygen-containing regeneration gas stream, at least a portion of the carbon-containing compounds adsorbed and/or absorbed onto the sorbent particles combust, thereby generating carbon oxide. In one embodiment, the carbon-on-sorbent content of the sulfur-laden sorbent particles can be adjusted in order to generate the desired level of carbon oxide in the regeneration zone of regenerator 140.

As discussed previously, the inventors have discovered that at least a portion of the regenerated sorbent particles withdrawn from the regeneration zone of regenerator 140 via conduit 240 can exhibit an unexpectedly slower-than-expected in situ silicate generation rate, as compared to similar sulfur-laden sorbent particles regenerated via conventional (e.g., carbon-oxide depleted) regeneration methods. According to one embodiment, the sorbent composition can have an in situ silicate generation rate less than about 0.25 percent metal per hour, less than about 0.20 percent metal per hour, less than about 0.175 percent metal per hour, or less than 0.15 percent metal per hour. In contrast, sorbents regenerated via conventional regeneration methods typically exhibit an in situ silicate generation rate in excess of 0.27 percent metal per hour.

As used herein, the term "in situ silicate generation rate," expressed in units of percent metal per unit time, refers to the total amount of metal oxide(s) converted to silicates under regeneration conditions divided by the total regeneration time of the sorbent composition. In one embodiment, in situ silicate generation rate can be expressed according to the following formula: (metal atoms converted in regenerated sorbent–metal atoms converted in initial sorbent)/total regeneration time, wherein "metal atoms converted" is expressed by the following formula: |(mass of metal in silicate compounds–mass of metal in other, non-silicate compounds)|/(total mass of metal in support component), expressed as a percentage. In one embodiment, the "initial sorbent particles" can comprise sulfur-laden sorbent particles, while, in another embodiment, the initial sorbent can comprise "fresh" particles added to the desulfurization system for the first time. According to one embodiment wherein the desulfurization system comprises a fluidized bed desulfurization system, the total regeneration time may be the average cumulative regeneration time experienced by a sorbent particle and may encompass one or more cycles. In another embodiment wherein the desulfurization system comprises a fixed or semi-fixed bed desulfurization system, the total regeneration time may be the total time the sorbent particles are exposed to regeneration conditions and may encompass a single regeneration cycle. In another embodiment, the metal can comprise zinc and the silicate generated can comprise zinc silicate.

Further, the inventors have discovered that sorbent compositions regenerated according to one embodiment of the present invention also exhibit lower-than-expected silicate concentration after exposure to the above-discussed regeneration conditions for a given period of time. For example, in one embodiment of the present invention, sorbent particles having a total time-on-stream (TOS) greater than about 20, greater than about 25, greater than about 30, or greater than about 35 hours can have a total silicate concentration less than 5 weight percent, less than about 4.5 weight percent, or less than about 4 weight percent, based on the total weight of the sorbent composition. This, too, is in direct contrast to conventionally regenerated desulfurization sorbents, which can exhibit silicate concentrations higher than 7.5 weight percent when subjected to the same regeneration conditions for less than 20 hours. In further contrast to conventional desulfurization sorbents, the sorbent composition employed according to one embodiment of the present invention can be substantially free of silicates prior to its introduction to the desulfurization system, such that at least about 75 weight percent, at least about 90 weight percent, or substantially all of any silicate contained on, in, or within the sorbent composition is generated in situ.

According to one embodiment, at least a portion of the regenerated sorbent particles can comprise an oxidized promoter metal component and/or a promoter metal-zinc aluminate substitutional solid solution. In one embodiment, the oxidized promoter metal component can be characterized according to the following formula: $M_XZn_YO$, wherein M is the promoter metal and X and Y are numeric values in the range of from about 0.01 to about 0.99. According to another embodiment, X can be in the range of from about 0.5 to about 0.9 or 0.6 to 0.8, while Y can be in the range of from about 0.1 to about 0.5, or 0.2 to 0.4. In another embodiment, X+Y=1.

According to another embodiment, the regenerated sorbent particles can comprise a promoter metal-zinc aluminate substitutional solid metal solution characterized by the formula: $M_ZZn_{(1-Z)}Al_2O_4$, wherein M is the promoter metal and Z is a numeric value between 0.01 and 0.99. Table 2, below, summarizes broad, intermediate, and narrow ranges for the amount of zinc oxide, oxidized promoter metal component ($M_XZn_YO$), perlite, and promoter metal-zinc aluminate ($M_ZZn_{(1-Z)}Al_2O_4$) in the oxidized sorbent composition employed in reactor 120 according to one embodiment of the present invention.

TABLE 2

Components of Oxidized Sorbent Composition

Reduced Sorbent Composition (wt %)

| Range | ZnO | $M_XZn_YO$ | Perlite | $M_ZZn_{(1-Z)}Al_2O_4$ |
|---|---|---|---|---|
| Broad | 10-90 | 5-70 | 5-50 | 1-50 |
| Intermediate | 20-60 | 15-60 | 10-40 | 5-30 |
| Narrow | 30-50 | 20-40 | 15-30 | 10-20 |

Referring back to FIG. 1, at least a portion of the regenerated sorbent particles withdrawn from regenerator 140 can be routed to regenerator receiver 136 and/or regenerator stripper 138 via conduits 240 and/or 244. In one embodiment, regenerator receiver 136 and regenerator stripper 138 can be operable to remove at least a portion or substantially all of any residual oxygen contained within or associated with the regenerated sorbent composition and can have similar structure and/or can be configured in a similar manner to reactor receiver 132 and/or reactor stripper 134, discussed in detail previously.

As shown in FIG. 1, at least a portion of the regenerated sorbent can then be transferred via conduit 246 to an optional reducer 150, wherein the sorbent particles can be at least partially reduced or "re-activated" via contact with a hydrogen-containing reduction gas stream (not shown) under reduction conditions. In one embodiment, reduction conditions can include a temperature in the range of from about 150° C. (302° F.) to about 540° C. (1004° F.), about 260° C. (500° F.) to about 480° C. (896° F.), or 315° C. (599° F.) to 455° C. (851° F.) and a pressure in the range of from about 175 kPa (25.4 psia) to about 10,450 kPa (1515.6 psia), or 205 kPa (29.7 psia) to about 795 kPa (115 psia). Typically, the average residence time of a sorbent particle in reducer 150 can be in the range of from about 0.1 hours to about 40 hours, about 0.2 hours to about 10 hours, or 0.5 hours to 1 hour. In one embodiment, the reduction gas stream comprises at least about 25 volume percent, at least about 50 volume percent, at least about 90 volume percent, or at least 95 volume percent hydrogen. Once the sorbent has been reactivated, the solid particles can be reintroduced into reactor 120 via conduit 250 and can continue on through desulfurization system 110 as discussed above.

The following example is intended to be illustrative of the present invention and to teach one of ordinary skill in the art to make and use the invention. These examples are not intended to limit the invention in any way.

EXAMPLE

The purpose of this example is to illustrate the relative differences between the in situ silicate generation rate of a desulfurization sorbent regenerated under conventional regeneration conditions and the in situ silicate generation rate of a desulfurization sorbent regenerated under regeneration conditions in accordance with one or more embodiments of the present invention.

Figure 2:
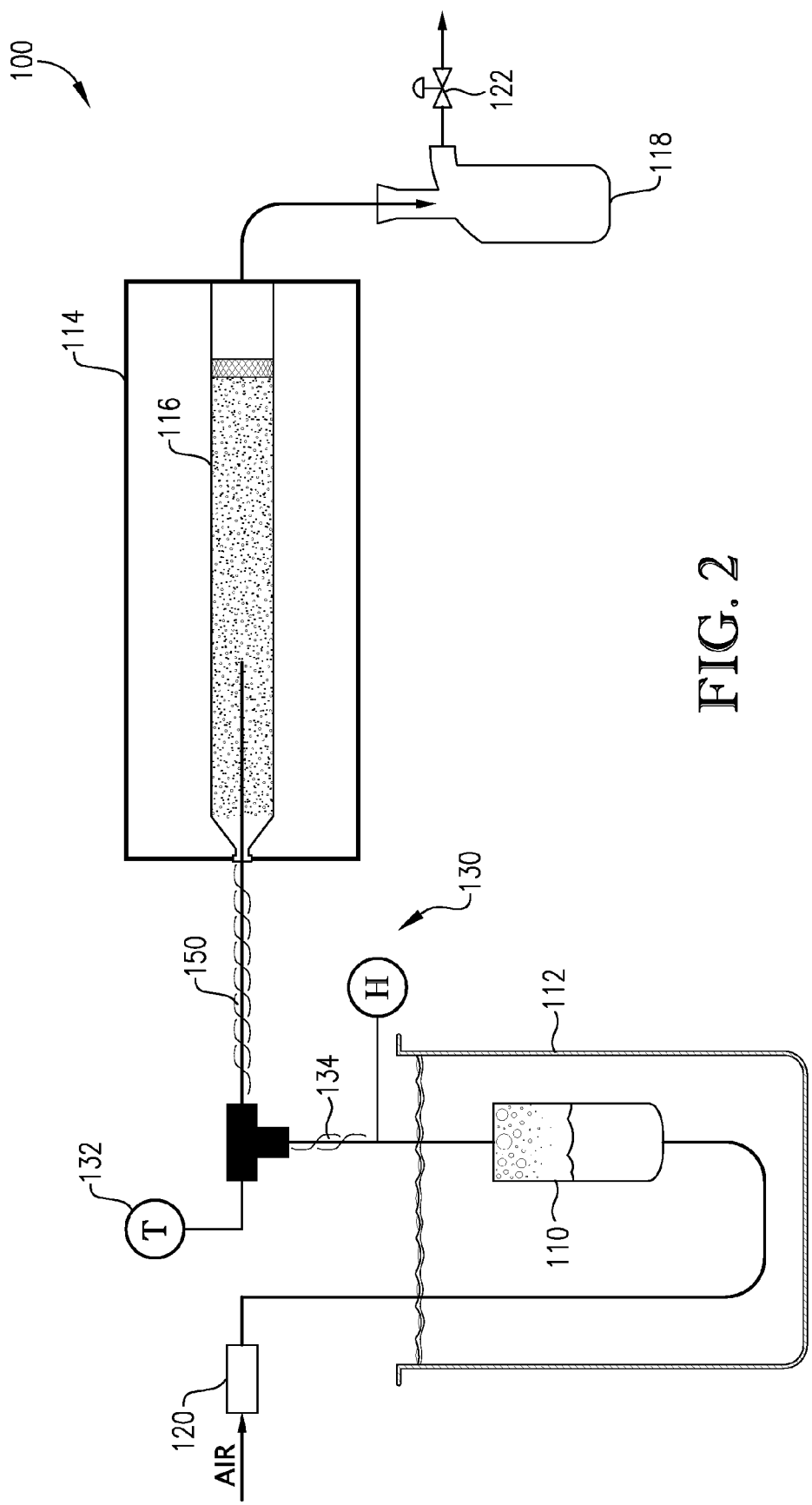
FIG. 2 is a schematic diagram of an apparatus used to carry out a desulfurization test described in the EXAMPLE.

FIG. 2 illustrates an exemplary lab-scale regeneration system 100. Lab-scale regeneration system 100 included a steel bubbler 110, a tube furnace 114, a regenerator vessel 116, and a knock-out vessel 118. A mass flow controller 120 controlled the flow rate of regeneration air, while a pressure control valve 122 maintained backpressure on the system. A temperature control system 130, that included a thermocouple 132 and heat tracing 134, was used to maintain and monitor the temperature of regenerator 116.

In operation, stream of regeneration gas passing through flow controller 120 flowed upwardly through steel bubbler 110, which was submerged in water bath 112 for temperature control. The residence time (e.g., flow rate) of the air stream was controlled in order to maintain a 5 psig. The temperature of the resulting humidified air stream was increased as the stream passed through heat-traced conduit 150 and into regenerator 116. Regenerator 116 was a 0.25 inch OD stainless steel tube regenerator positioned in the center of tube furnace 114. Approximately 2 mL of sorbent was loaded into regenerator 116 near its center and secured in place by two glass frits. Thermocouple 132 extended into the sorbent bed and was integrally connected to heat tracing 134 in order to maintain the regenerator bed temperature at 1,000° F. (537.8° C.). The outlet of regenerator 116 was fluidly coupled via conduit 152 with 30-mL knock-out vessel 118. Pressure controller 122 controlled the flow rate of vapor exiting knock-out vessel 118, thereby maintaining the desired backpressure on regenerator system 100.

Three aliquots of a single regenerated sample of S Zorb™ desulfurization sorbent (commercially available from Süd-Chemie, AG in Louisville, Ky.), which had previously been exposed to operating conditions in a commercial desulfurization unit, were separately loaded into three lab-scale regenerator systems, as described above with reference to FIG. 2. The sorbent in the first regenerator system was regenerated under conventional regeneration conditions, while the sorbents in the second and third regenerator systems were regenerated according to embodiments of the present invention. The operating conditions for each regenerator system are summarized in Table 3, below.

Comparative samples 1-4 were withdrawn from the first regenerator system after approximately 10, 18, 23, and 61 hours, respectively, while Inventive samples 5 and 6 were withdrawn from the respective second and third regenerator systems after approximately 42 hours. Each sample was analyzed via XRD and the necessary calculations were performed to determine the total weight percent zinc silicate, the percent zinc as zinc silicate, and the in situ zinc silicate formation rate.

TABLE 3

Operating Conditions for and Results from Experimental Trials

| | | OPERATING CONDITIONS | | | ANALTYIC RESULTS | | |
|---|---|---|---|---|---|---|---|
| Trial | TOS (hr) | Total Pressure (psig) | $O_2 p^*$ (psig) | $CO_2 p^*$ (psig) | $Zn_2SiO_4$ (wt %) | Zn as $Zn_2SiO_4$ (wt %) | $Zn_2SiO_4$ Generation Rate (wt % Zn per hr) |
| 1 Comparative | 9.8 | 18 | 5.5 | 0 | 1.8 | 2.7 | 0.273 |
| 2 Comparative | 18.0 | 17 | 5.4 | 0 | 3.5 | 5.2 | 0.288 |
| 3 Comparative | 23.1 | 17 | 5.4 | 0 | 5.1 | 8.2 | 0.355 |
| 4 Comparative | 61.0 | 18 | 5.5 | 0 | 11.8 | 18.2 | 0.298 |
| 5 Inventive | 41.7 | 0 | 1.9 | 2.9 | 4.0 | 5.6 | 0.134 |
| 6 Inventive | 42.1 | 0 | 1.9 | 1.5 | 3.7 | 5.0 | 0.119 |

Table 3 shows that when a sorbent composition comprising zinc and silica is regenerated at high temperatures and with a relatively high water partial pressure, the in situ formation of zinc silicate is inhibited when the regeneration zone additionally includes a certain amount of carbon dioxide. Thus, sorbents regenerated, ceteris paribus, in the presence of a carbon oxide exhibit substantially lower rates of in situ zinc silicate formation than sorbents regenerated under conventional conditions.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

DEFINITIONS

As used herein, the terms "a," "an," "the," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "carbon oxide" refers to carbon dioxide, carbon monoxide, and combinations thereof.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise" provided above.

As used herein, the term "cracked-gasoline" denotes a mixture of hydrocarbons boiling in a range of from about 35° C. to about 260° C., or any fraction thereof, that are products of either thermal or catalytic processes that crack larger hydrocarbon molecules into smaller molecules.

As used herein, the term "desulfurization conditions" refer to any conditions necessary to remove at least a portion of the sulfur and/or sulfur-containing compounds from a hydrocarbon stream.

As used herein, the term "diesel fuel" denotes a mixture of hydrocarbons boiling in a range of from about 150° C. to about 400° C., or any fraction thereof.

As used herein, the term "enriched air" refers to a stream comprising nitrogen and greater than about 21 mole percent oxygen.

As used herein, the term "gasoline" denotes a mixture of hydrocarbons boiling in a range of from about 35° C. to about 260° C., or any fraction thereof.

As used herein, the terms "having," "has," and "have" have the same open-ended meaning as "comprising," "comprises," and "comprise" provided above.

As used herein, the term "in situ" refers to something that occurs in a desulfurization unit and/or during a desulfurization process.

As used herein, the term "in situ silicate generation rate," refers to the total amount of metal oxide(s) converted to silicates under regeneration conditions divided by the total regeneration time of the sorbent composition, expressed in units of percent metal per unit time.

As used herein, the terms, "including," "include," and "included" have the same open-ended meaning as "comprising," "comprises," and "comprise" provided above.

As used herein, the term "metal" generally refers to an elemental metal or other metal-containing compound.

As used herein, the term "metal oxide" refers to a metal oxide and/or a metal oxide precursor.

As used herein, the terms "predominantly," "primarily," "principally," and "in major portion," when used to describe the presence of a particular component of a fluid stream, means that the fluid stream comprises at least 50 mole percent of the stated component.

As used herein, the term "reduced-valence promoter metal" refers to a promoter metal having a valence with is less than the valence of the promoter metal component in its common oxidized state.

As used herein, the term "regeneration conditions" refer to conditions necessary to remove at least a portion of sorbed sulfur from the sulfur-laden sorbent.

As used herein, the term "silicate" refers to any compound comprising silicon, oxygen, and one or more metals with or without hydrogen.

As used herein, the terms "sorb" and/or "sorption" refer to any type of physical and/or chemical adsorption and/or absorption.

CLAIMS NOT LIMITED TO THE DISCLOSED EMBODIMENTS

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A process for regenerating a plurality of sorbent particles, said process comprising:
   (a) introducing a plurality of sulfur-laden sorbent particles into a regeneration zone, wherein said sulfur-laden sorbent particles comprise a support component that comprises a silica source;
   (b) introducing one or more gas streams into said regeneration zone, wherein said one or more gas streams comprise oxygen and carbon oxide; and
   (c) regenerating at least a portion of said sulfur-laden sorbent particles in said regeneration zone under regeneration conditions to thereby provide a plurality of regenerated sorbent particles,
   wherein the combined molar ratio of carbon oxide to oxygen in said one or more gas streams introduced into said regenerator is greater than 0.01:1.

2. The process of claim 1, wherein said one or more gas streams comprise a regeneration gas stream and a carbon oxide stream, wherein said introducing of step (b) includes introducing said regeneration gas stream and said carbon oxide stream into said regeneration zone separately.

3. The process of claim 2, wherein said regeneration gas stream comprises less than 0.05 mole percent carbon oxide, wherein said carbon oxide stream comprises at least 85 mole percent carbon oxide.

4. The process of claim 3, wherein said carbon oxide stream predominantly comprises carbon dioxide.

5. The process of claim 1, wherein said one or more gas streams comprise a regeneration gas stream and a carbon oxide stream, wherein said regeneration gas stream and said carbon oxide stream are combined prior to said introducing of step (b).

6. The process of claim 5, wherein said regeneration gas stream comprises less than 0.05 mole percent carbon oxide, wherein said carbon oxide stream comprises at least 85 mole percent carbon oxide.

7. The process of claim 1, wherein said support component further comprises a metal oxide.

8. The process of claim 7, wherein said regeneration conditions include a temperature in the range of from about 250° C. to about 650° C. and a water partial pressure in the range of from about 1 psig to about 10 psig, wherein said regenerated sorbent particles withdrawn from said regeneration zone exhibit an in situ silicate generation rate less than about 0.25 percent metal per hour.

9. The process of claim 8, wherein said regeneration conditions include a time-on-stream of greater than 30 hours, wherein said metal oxide comprises zinc oxide, wherein said regenerated sorbent particles comprise less than 6.25 weight percent zinc silicate.

10. The process of claim 9, wherein at least 75 weight percent of said zinc silicate has been generated in situ.

11. The process of claim 1, wherein said silica source is perlite.

12. The process of claim 1, wherein said sulfur-laden sorbent particles further comprise a promoter metal.

13. The process of claim 12, wherein said promoter metal is selected from the group consisting of nickel, cobalt, iron, manganese, tungsten, silver, gold, copper, platinum, zinc, tin, ruthenium, molybdenum, antimony, vanadium, iridium, chromium, palladium, rhodium, and mixtures thereof.

14. The process of claim 13, wherein at least a portion of said promoter metal comprises a reduced valence promoter metal.

15. The process of claim 14, wherein said promoter metal is nickel.

16. The process of claim 12, wherein said sulfur-laden sorbent particles comprise a substitutional solid metal solution characterized by the formula $M_A Zn_B$, wherein M is said promoter metal and A and B are numeric values between 0.01 and 0.99.

17. The process of claim 16, wherein said carbon oxide stream predominantly comprises carbon dioxide.

18. The process of claim 1, wherein said regeneration conditions include a carbon oxide partial pressure greater than 2 psig.

19. The process of claim 1, wherein at least a portion of said regeneration zone is defined within a fluidized bed regenerator.

20. The process of claim 1, further comprising introducing at least a portion of said regenerated sorbent particles into a desulfurization zone and contacting at least a portion of said regenerated sorbent particles with a sulfur-containing hydrocarbon stream in said desulfurization zone under desulfurization conditions to thereby provide a plurality of sulfurized sorbent particles and a sulfur-depleted hydrocarbon stream, wherein said sulfur-laden particles introduced into said regeneration zone in step (a) comprise at least a portion of said sulfurized sorbent particles.

21. The process of claim 20, wherein at least a portion of said desulfurization zone is defined within a fluidized bed reactor.

22. The process of claim 20, wherein said sulfur-containing hydrocarbon stream comprises cracked gasoline or diesel.

23. The process of claim 20, wherein said desulfurization zone has a sulfur-removal efficiency of at least 50 percent.

24. The process of claim 20, further comprising, prior to introducing said at least a portion of said regenerated sorbent particles into said desulfurization zone, contacting at least a portion of said regenerated sorbent particles with a reduction gas in a reduction zone to thereby provide a plurality of reduced sorbent particles, wherein said regenerated sorbent particles introduced into said desulfurization zone comprise at least a portion of said reduced sorbent particles.

25. The process of claim 20, wherein said sulfur-depleted hydrocarbon stream comprises less than 50 ppmw of one or more sulfur-containing compounds.

26. The process of claim 1, wherein said combined molar ratio of carbon oxide to oxygen in said one or more gas streams is greater than 0.05:1.

* * * * *